US011438068B2

(12) United States Patent
Aksu et al.

(10) Patent No.: US 11,438,068 B2
(45) Date of Patent: Sep. 6, 2022

(54) SYSTEMS AND METHODS FOR MANAGING DATA ON A BACKHAUL NETWORK

(71) Applicant: Verizon Patent and Licensing Inc., Arlington, VA (US)

(72) Inventors: Arda Aksu, Lafayette, CA (US); Donna L. Polehn, Mercer Island, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 500 days.

(21) Appl. No.: 16/453,224

(22) Filed: Jun. 26, 2019

(65) Prior Publication Data

US 2020/0412456 A1 Dec. 31, 2020

(51) Int. Cl.
*H04W 88/00* (2009.01)
*H04B 10/2575* (2013.01)
*H04W 92/02* (2009.01)
*H04W 88/06* (2009.01)

(52) U.S. Cl.
CPC ....... *H04B 10/25759* (2013.01); *H04W 88/06* (2013.01); *H04W 92/02* (2013.01)

(58) Field of Classification Search
CPC ... H04W 88/06; H04W 84/047; H04W 12/06; H04W 48/12; H04W 84/04
See application file for complete search history.

(56) References Cited

U.S. PATENT DOCUMENTS

| 7,019,638 B1* | 3/2006 | Wallace | G01K 1/024 340/531 |
|---|---|---|---|
| 2020/0396674 A1* | 12/2020 | Yuan | H04W 28/16 |
| 2021/0127380 A1* | 4/2021 | Liu | H04W 40/22 |
| 2021/0176658 A1* | 6/2021 | Wang | H04W 84/047 |

* cited by examiner

*Primary Examiner* — Abdelillah Elmejjarmi

(57) ABSTRACT

A method may include receiving, at a first wireless station, first data wirelessly transmitted from first user equipment (UE) devices, wherein the first data includes quality of service (QoS) information, and forwarding the first data from the first UE devices to a second wireless station, wherein the first wireless station does not map the QoS information included with the first data. The method also includes receiving, by the second wireless station, the first data and second data transmitted from second UE devices, wherein the second data includes QoS information. The method may further include forwarding, by the second wireless station, the first and second data to a third wireless station, wherein the second wireless station does not map the QoS information included in the first or second data, and wherein the third wireless station is configured to forward the first and second data via a backhaul network.

20 Claims, 9 Drawing Sheets

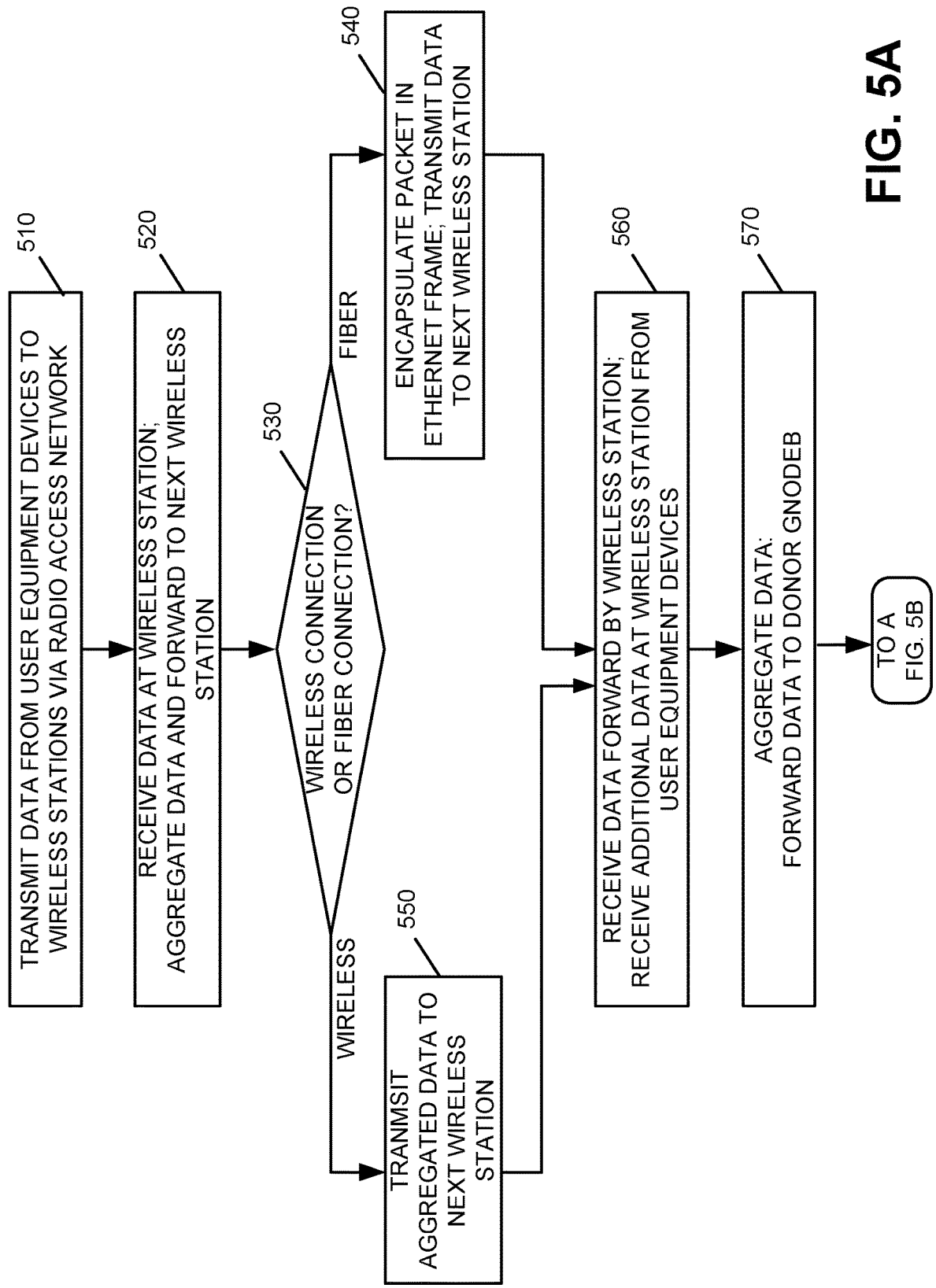

SYSTEMS AND METHODS FOR MANAGING DATA ON A BACKHAUL NETWORK

BACKGROUND INFORMATION

Data packets transmitted from user devices over a radio access network (RAN) are typically received by a base station, such as an evolved Node B (eNodeB) in a long term evolution (LTE) network. At the base station, the received data packets are converted into wireline packets for transmission over a wired or optical backhaul network. The base station typically includes a scheduler/router that maps the priorities of the received data packets and forwards the mapped priority information with the data packets to allow the backhaul network to maintain the desired priority or quality of service level.

Problems associated with converting data packets received via a RAN to wireline packets and forwarding the converted packets via the backhaul network is the requirement of additional equipment to perform the required mapping, scheduling and forwarding, as well as additional latency and bandwidth for carrying the additional information. For example, with the introduction of Fifth Generation (5G) networks, converting and mapping packets received via a RAN slice to wireline packets may include using multi-protocol label switching (MPLS), segment routing, etc. Such processing increases the complexity associated with managing and troubleshooting problems that may occur during routing. In addition, mapping priority information associated with data packets received via a RAN slice into priorities included in the wireline packets is time consuming and increases latency with respect to forwarding data packets to their destinations.

BRIEF DESCRIPTION OF THE DRAWINGS

FIGS. 5A and 5B are flow diagrams illustrating processing by various components in FIGS. 1-3 associated with forwarding data packets to their intended destinations.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein include an environment with a number of wireless stations that may not include a wired connection to a backhaul network, and forward data in a hop-by-hop manner to other wireless stations until reaching a termination wireless station that interfaces with a backhaul network. The wireless stations maintain data packets in their original format when forwarding data to the terminating wireless station, such as a wireless base station that includes wired connections to a backhaul network. For example, when a portion of a 5G radio access network (RAN) includes a number of wireless base stations or hops, packets may be maintained in their original format until reaching the terminating base station, such as a next generation node B (gNB) (sometimes referred to as a donor gNB), that interfaces with a backhaul network. Each wireless station up through the terminating wireless station performs no quality of service (QoS) or priority mapping associated with the QoS information included in the received data packets. This allows the wireless stations to efficiently forward data toward the core network, ensures data integrity and retention of information and also allows the RAN to maintain slice priorities within the network. Further, maintaining the packets in their original format increases the speed in processing and forwarding of data packets. For example, since the wireless station perform no conversion between media access control (MAC) traffic and Internet protocol (IP) traffic, latency in the network is reduced. In addition, by performing no QoS mapping or converting of traffic into IP traffic, any troubleshooting of problems at the wireless stations is simplified.

Figure 1:
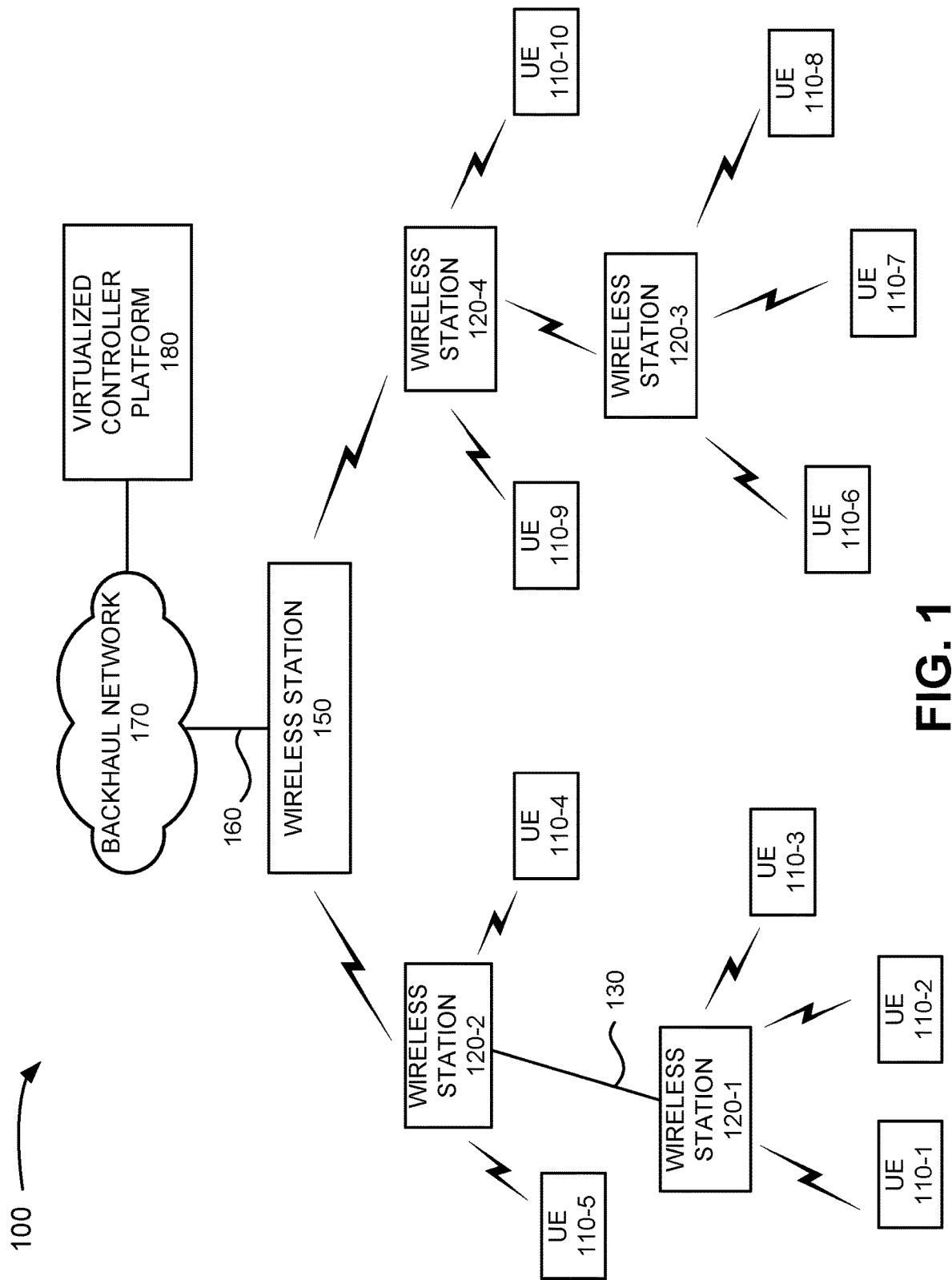
FIG. 1 illustrates an exemplary environment in which systems and methods described herein may be implemented.

FIG. 1 is a block diagram of an exemplary environment 100 in which systems and methods described herein may be implemented. Environment 100 may include user equipment (UE) devices 110-1 through 110-10 (referred to herein individually as UE device 110, UE device 110-*x*, UE 110 or UE-110-*x* and collectively as UE devices 110 or UEs 110), wireless stations 120-1 through 120-4 (referring to herein individually as wireless station 120 or 120-*x* and collectively as wireless stations 120), wireless station 150, backhaul network 170 and virtualized controller platform (VCP) 180.

UEs 110 may each include a mobile device, such as wireless or cellular telephone device (e.g., a conventional cell phone with data processing capabilities), a smart phone, a personal digital assistant (PDA) that can include a radiotelephone, etc. In another implementation, UE 110 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc. In other implementations, UEs 110 may be implemented as a machine-type communications (MTC) device, an Internet of Things (IoT) device, a machine-to-machine (M2M) device, etc., that includes communication functionality, such as a home appliance device, a home monitoring device, a camera, etc. UEs 110 may connect to wireless stations 120 in a wireless manner. UE 110 and the person associated with UE 110 (e.g., the party holding or using UE 110) may be referred to collectively as UE 110 in the description below.

In an exemplary implementation, UEs 110 may use wireless channels to communicate with wireless stations 120. The wireless channels may correspond, for example, to a physical layer in accordance with different radio access technology (RAT) types. For example, wireless channels may correspond to the physical layer associated with Fourth Generation (4G), 4.5G, Fifth Generation New Radio (5G NR) standards (e.g., 3GPP standards for 4G, 4.5G and 5G air interfaces). In an exemplary implementation, UEs 110 may be 5G-capable devices that provide voice communication, mobile broadband services (e.g., video streaming, real-time gaming, high speed Internet access etc.), best effort data traffic, and/or other types of applications via a 5G NR service using millimeter wave (mmWave) radio frequencies.

Wireless stations 120 (sometimes referred to as base stations, relays or integrated access backhaul nodes) may each include a network device that has computational and wireless communication capabilities. Wireless stations 120 may each include a transceiver system that connects UE device 110 to other components of a RAN and core network using wireless/wired interfaces. Wireless stations 120 may be implemented as a base station (BS), a base transceiver station (BTS), a Node B, an evolved Node B (eNodeB or eNB), an evolved LTE (eLTE) eNB, a next generation Node B (gNB), a radio network controller (RNC), a radio network controller (RNC), a remote radio head (RRH), an RRH and a baseband unit (BBU), a BBU, a small cell node (e.g., a picocell node, a femtocell node, a microcell node, a repeater, a relay, etc.), or another type of wireless station/node that provides wireless access to/from UEs 110 and other wireless stations 120.

In one implementation, wireless station 120 may be a 5G capable device, such as a gNB, configured to receive 5G communications over a RAN. In such implementations, wireless stations 120 may include one or more radio frequency (RF) transceivers (also referred to as cells and/or base station sectors) facing particular directions. For example, wireless stations 120 may include three RF transceivers and each RF transceiver may service a 120° sector of a 360° field of view. Each RF transceiver may also include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element.

Wireless stations 120 may be configured to communicate in environment 100 in a hop-by-hop manner until reaching wireless station 150. For example, wireless stations 120 and wireless station 150 may be part of a RAN for connecting UEs 110 to backhaul network 170. Wireless stations 120 may communicate with each other over wireless channels and/or wired channels. For example, in some instances, wireless stations 120 may be configured to communicate via wired connections, such as fiber optic cables. The term "wired connection" should be construed herein to include any type of wired connection including fiber optic connections/cables. In such implementations, wireless stations 120 may use wired connections to communicate with other wireless stations 120 when wireless communications are not available (e.g., a line of sight is not available between wireless stations 120). For example, when a line of sight is not available between wireless station 120-1 and 120-2, wireless station 120-1 may be configured to communicate with wireless station 120-2 via wired connection 130. Wired connection 130 may include a fiber optic cable or another type of wired connection.

Wireless station 150 may include one or more computing devices or systems that are part of a wireless station that acts as an interface between the RAN associated with UEs 110 and wireless stations 120 and backhaul network 170. For example, wireless station 120 may correspond to a donor gNodeB that interfaces with backhaul network 170 and may include similar elements/components as wireless stations 120. For example, wireless station 150 (also referred to herein as gNB 150) may include one or more RF transceivers facing particular directions. For example, wireless station 150 may include three RF transceivers and each RF transceiver may service a 120° sector of a 360° field of view. Each RF transceiver may also include an antenna array that includes an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element.

Backhaul network 170 may include one or more wired, wireless and/or optical networks that are capable of receiving and transmitting data, voice and/or video signals. For example, backhaul network 170 may include a local area network (LAN), a wide area network (WAN), a metropolitan area network (MAN), an optical network, a cable television network, a satellite network, a wireless network (e.g., a code division multiple access (CDMA) network, a general packet radio service (GPRS) network, and/or an LTE network), an ad hoc network, a telephone network (e.g., the Public Switched Telephone Network (PSTN) or a cellular network), an intranet, the Internet or a combination of networks capable of transmitting data. In one implementation, backhaul network 170 may allow the delivery of Internet Protocol (IP) services to UE device 110, and may interface with other external networks, such as private IP networks.

According to one implementation, backhaul network 170 may include a core network, such as a core 5G NR network. In such implementations, backhaul network 170 may include various network elements implemented in network devices (not shown) in backhaul network 170. Depending on the implementation, backhaul network 170 may include various network elements, such as a gateway, a support node, a serving node, a router, a switch, a bridge, etc. For example, in a 5G environment, backhaul network 170 may include network elements implementing a user plane function (UPF), a session management function (SMF), a core access and mobility management function (AMF), a unified data management (UDM), policy control function (PCF), as well as other network elements associated with billing, security, authentication and authorization, network policies, subscriber profiles, network slicing, and other network elements that facilitate the forwarding of data to its destination. In some implementations, backhaul network 170 may include a network for delivering IP multimedia services and may provide media flows between UE device 110 and external IP networks (not shown in FIG. 1).

VCP 180 may include one or more processors, computer devices, etc., that control forwarding packets via a RAN to backhaul network 170. For example, VCP 180 may be configured to support network slices configured with different characteristics to support different types of applications and/or services, such as video streaming, massive Internet-of-Things (IoT) traffic, autonomous driving, etc. VCP 180 may be configured to assign and/or manage network slices that are structured for the type of network traffic initiated by UE devices 110 (e.g., with particular characteristics for latency, bandwidth, jitter, etc.). VCP 180 may also apply admission controls to direct wireless stations 120, wireless station 150 and/or other network devices in backhaul network 170 to admit, block, delay or redirect the requesting UE device 110 depending on slice congestion levels and other factors.

The exemplary configuration illustrated in FIG. 1 is provided for simplicity. It should be understood that a typical environment may include more or fewer devices than illustrated in FIG. 1. For example, environment 100 may include a large number (e.g., thousands or more) of UEs 110, wireless stations 120 and 150, as well as multiple backhaul networks 170 and VCPs 180. In addition, environment 100 may include additional elements, such as evolved NodeBs, switches, gateways, routers, monitoring devices, etc., that aid in routing data to/from UEs 110.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
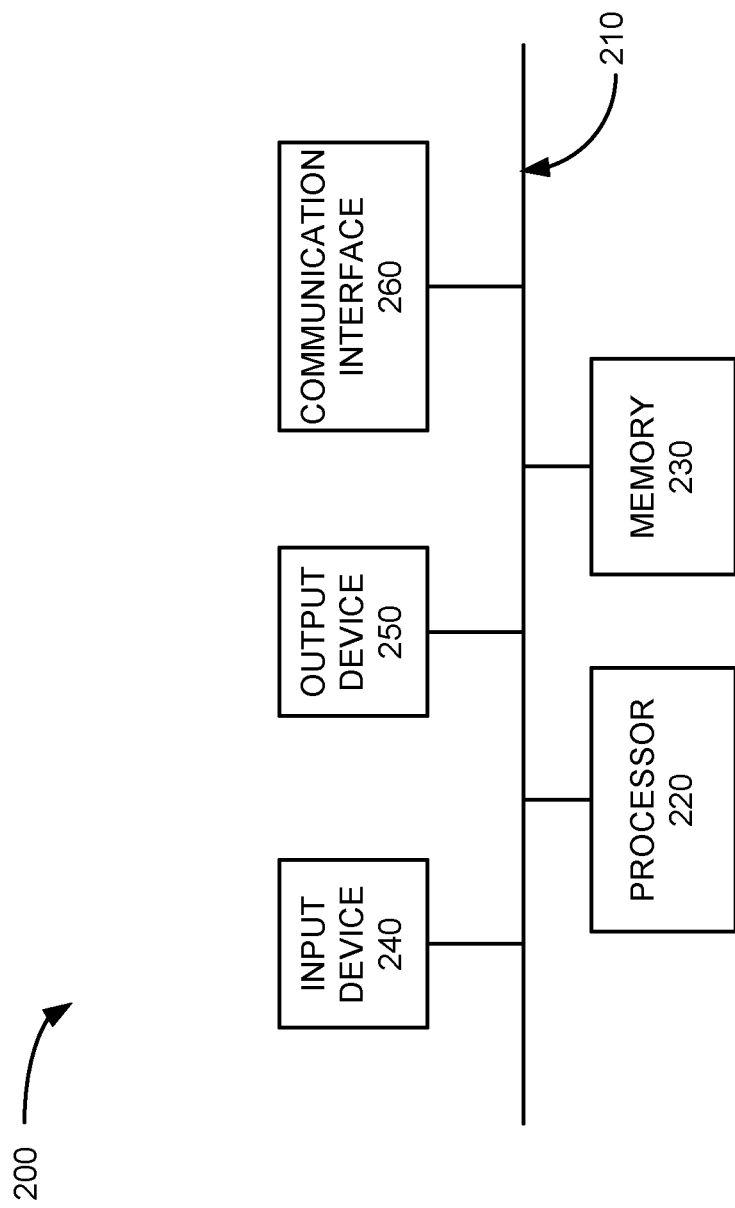
FIG. 2 illustrates an exemplary configuration of components implemented in one or more of the devices/elements of FIG. 1.

FIG. 2 illustrates an exemplary configuration of a device 200. Device 200 may correspond to or include elements implemented in UE 110, wireless station 120, wireless station 150 and VCP 180. Referring to FIG. 2, device 200 may include bus 210, processor 220, memory 230, input device 240, output device 250 and communication interface 260. Bus 210 may include a path that permits communication among the elements of device 200.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information, such as a keyboard, a keypad, a mouse, a pen, a microphone, a touch screen, voice recognition and/or biometric mechanisms, etc. Output device 250 may include a mechanism that outputs information to the user, including a display (e.g., a liquid crystal display (LCD)), a printer, a speaker, etc. In some implementations, a touch screen display may act as both an input device and an output device.

Communication interface 260 may include one or more transceivers that device 200 uses to communicate with other devices via wired, wireless or optical mechanisms. For example, communication interface 260 may include one or more radio frequency (RF) transmitters, receivers and/or transceivers and one or more antennas for transmitting and receiving RF data via network 150. Communication interface 260 may also include a modem or an Ethernet interface to a LAN or other mechanisms for communicating with elements in a network, such as network 150 or another network.

The exemplary configuration illustrated in FIG. 2 is provided for simplicity. It should be understood that device 200 may include more or fewer devices than illustrated in FIG. 2. In an exemplary implementation, device 200 performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
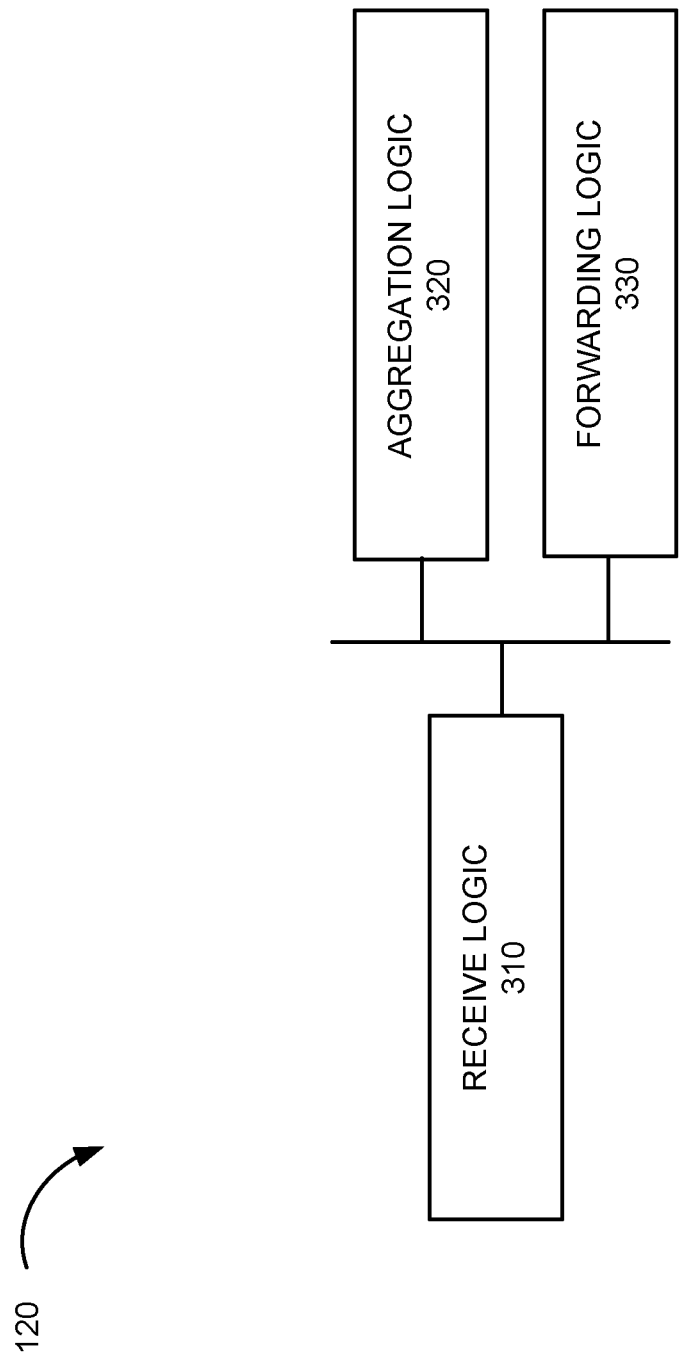
FIG. 3 illustrates an exemplary configuration of logic components included in one or more of the wireless stations of FIG. 1.

FIG. 3 is a block diagram illustrating exemplary components implemented in wireless stations 120. In an exemplary implementation, all or some of the components illustrated in FIG. 3 may be implemented by processor 220 executing software instructions stored in memory 230.

Referring to FIG. 3, wireless station 120 includes receive logic 310, aggregation logic 320 and forwarding logic 330. Receive logic 310 may include logic associated with interfacing with UEs 110 and other wireless stations 120. In an exemplary implementation, receive logic 310 may include a front end, such as one or more RF transceivers, that receives data packets sent wirelessly from UEs 110 and/or wireless stations 120. Receive logic 310 may also include input devices/ports associated with receiving data packets via wired connections, such as wired connection 130 between wireless stations 120-1 and 120-2.

Aggregation logic 320 may include logic associated with combining data received from UEs 110 and forwarding the data on to the next wireless stations 120 and/or wireless station 150. For example, aggregation logic 320 associated with wireless station 120-3 may aggregate or combine data received from UEs 110-6, 110-7 and 110-8 and forward the combined data over a RAN/network slice to wireless station 120-4. For example, aggregation logic 320 may receive data from various UEs 110 having different 5G quality of service identifiers (5QIs). Aggregation logic 320 may combine the data with the different 5QIs and forward the data without mapping or modifying the various 5QI values included with the data, as described in detail below.

Forwarding logic 330 may include logic associated with forwarding aggregated data received from another wireless station 120, along with data received from UEs 110 service by wireless station 120 to either a next wireless station 120 or wireless station 150. For example, forwarding logic 330 may forward data via one or more RF transceivers and/or wired output ports. In an exemplary implementation, forwarding logic 330 in combination with aggregation logic 320 may forward data to a next wireless station 120 or wireless station 150 without performing any QoS (e.g., 5QI) or priority mapping associated with the received data, as described in detail below.

Although FIG. 3 shows exemplary components of wireless station 120, in other implementations, wireless station 120 may include fewer components, different components, differently arranged components, or additional components than depicted in FIG. 3. In addition, functions described as being performed by one of the components in FIG. 3 may alternatively be performed by another one or more of the components of wireless station 120.

Figure 4A:
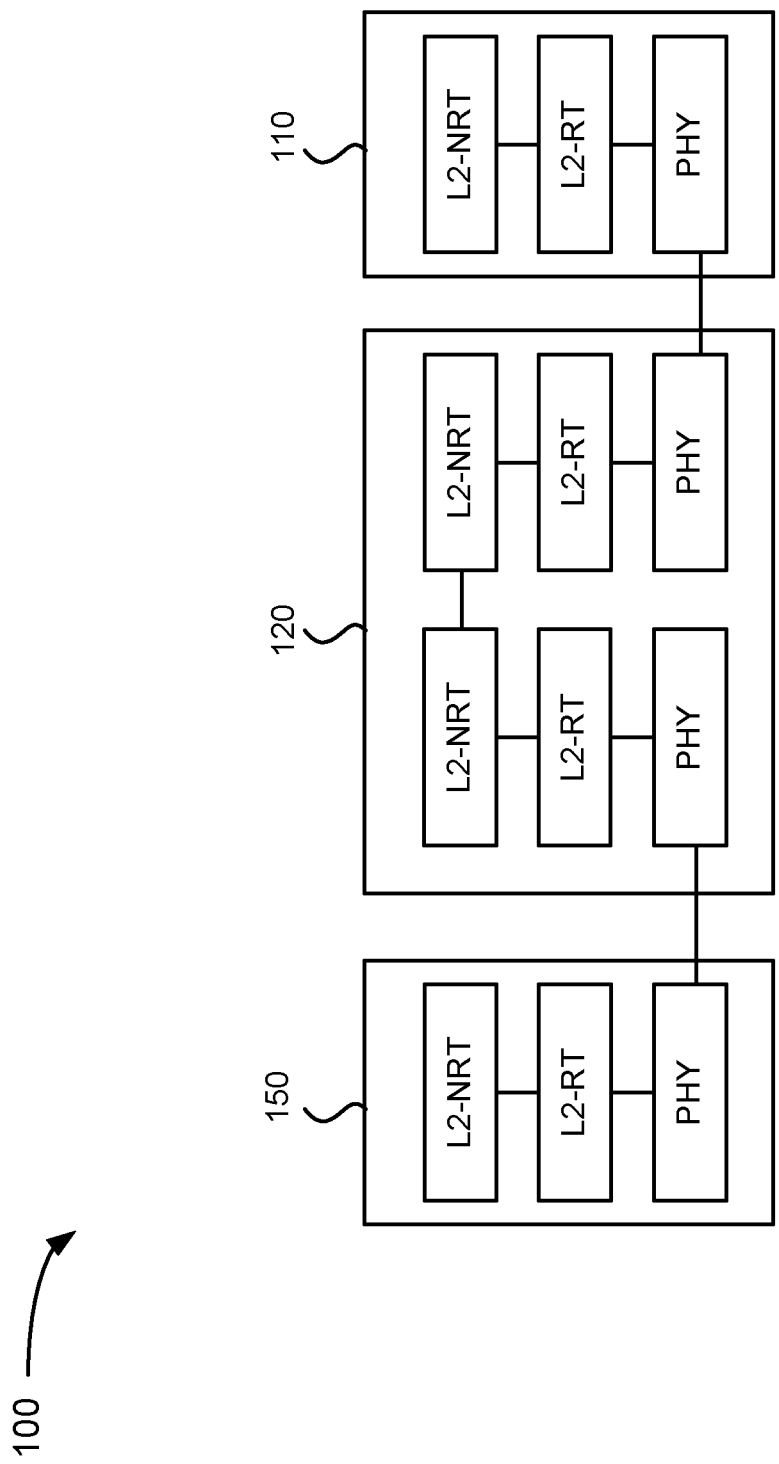
FIGS. 4A-4D illustrate protocol stacks implemented in one or more of the devices illustrated in FIG. 1.

As described above, wireless stations 120 may maintain received data packets in their original format when forwarding data packets to a next wireless station 120 and wireless station 150. FIG. 4A illustrates a portion of environment 100 and exemplary protocol stacks implemented in UE 110, wireless station 120 and wireless station 150 in accordance with an exemplary implementation. The protocol stacks may facilitate the transfer of data in environment 100 and may be implemented by, for example, processor 220 executing instructions in memory 230 of the respective UE 110, wireless station 120 and wireless station 150.

In this example, assume that UE 110 includes a wireless connection with wireless stations 120 and that wireless stations 120 includes a wireless connection with wireless station 150. The protocol stack implemented in UE 110 includes a layer 1 or physical (PHY) layer and a layer 2 (L2)

or data link layer, which includes an L2 real time (RT) layer and an L2 non-real time (nRT) layer. As illustrated, wireless station 120 and wireless station 150 similarly implement a protocol stack including PHY layer, an L2-RT layer and a L2-nRT layer. In an exemplary implementation, packets received from UE 110 may be forwarded to wireless station 120. Wireless station 120 illustrates both the input and output protocol stacks including PHY layer, L2-RT layer and L2-nRT layer. Wireless station 120 forwards data received from UE 110 (and other UEs 110) without any mapping of QoS or priority information or converting data packets into higher level data packets, such as Internet protocol (IP) packets. For example, as described above, packets received by wireless station 120 from UE 110 may be received with QoS information, such as 5QI values. Aggregation logic 320 and/or forwarding logic 330 of wireless station 120 may receive the data and forward the data received via a RAN/ network slice to wireless station 150, without encapsulating the data into a higher layer packet/frame and without performing QoS mapping or scheduling at wireless station 120. In this manner, latency associated with processing at wireless station 120 is minimized.

Figure 4B:
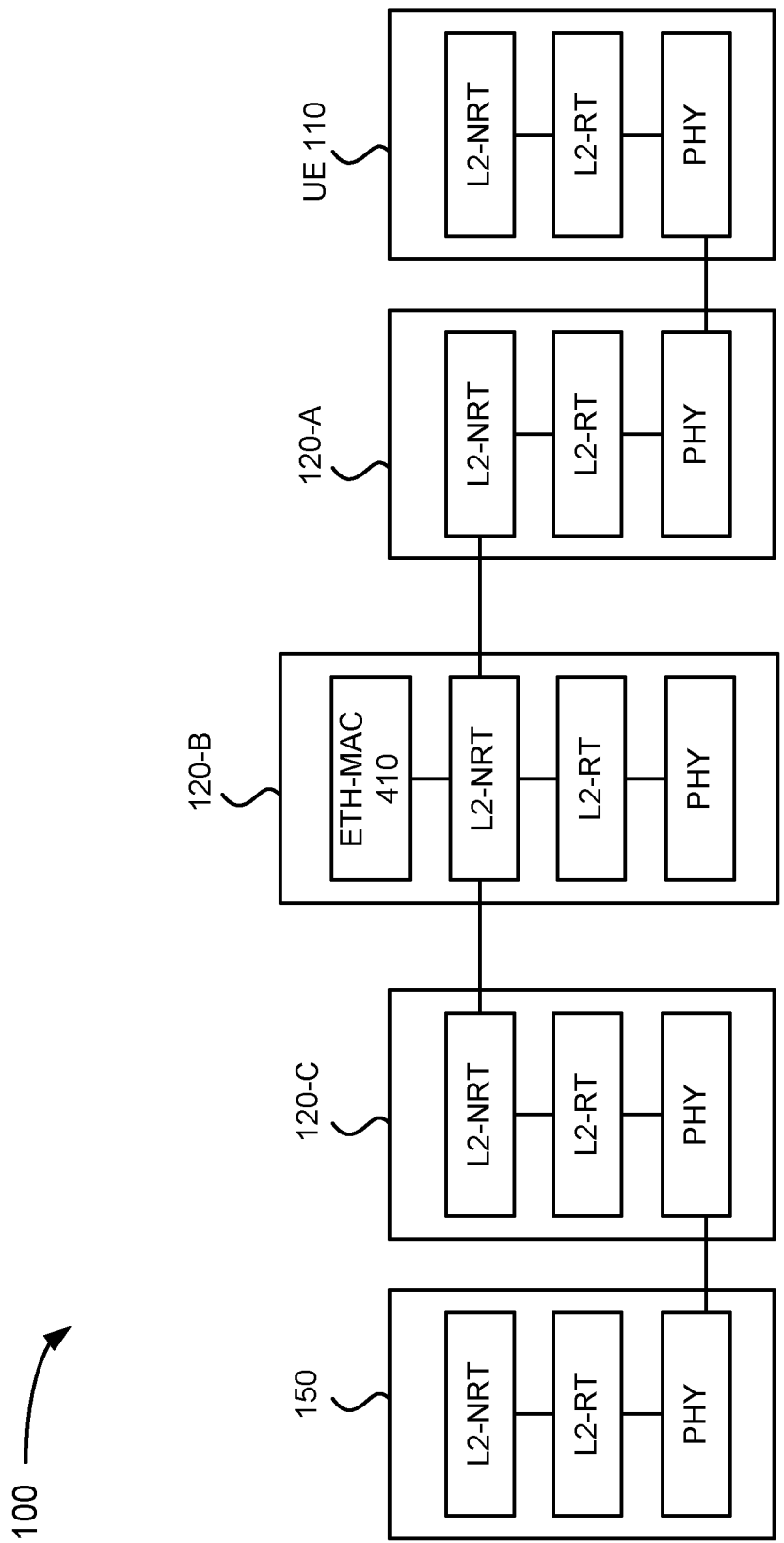

FIG. 4B illustrates a portion of environment 100 in accordance with another exemplary implementation. In this example, one UE 110, three wireless stations 120 (i.e., 120-A, 120-B and 120-C) and wireless station 150 are illustrated. In this example, assume that wireless station 120-A communicates with next hop wireless station 120-B wirelessly and wireless station 120-B communicates with next hop wireless station 120-C via a wired connection. Similar to UE 110 and wireless station 120 in FIG. 4A, UE 110 and wireless station 120-A may each implement a protocol stack including PHY layer, L2-RT layer and L2-nRT layer. Also similar to FIG. 4A, wireless station 120-A may forward data packets to wireless station 120-B without any QoS/priority mapping or converting data packets into high layer data packets.

However, in this example, wireless station 120-B may not have a wireless connection with wireless station 120-C. In this scenario, wireless station 120-B acts as a wired or fiber optic relay for forwarding data packets to the next hop wireless station 120 (i.e., wireless station 120-C in this example). In an exemplary implementation, forwarding logic 330 in wireless station 120-C may encapsulate data received from wireless station 120-A, along with data that wireless station 120-B receives from UEs 110 that wireless station 120-B services (e.g., UEs 110 within a line of sight of wireless station 120-B) in an Ethernet media access control (MAC) frame, as illustrated by ETH-MAC block 410 within wireless station 120-B illustrated in FIG. 4B. In situations in which the connection between wireless stations 120-B and 120-C is a fiber connection, encapsulating the data and forwarding the data via an Ethernet MAC frame will not add significant processing time and will not adversely impact latency associated with forwarding data due to the high speeds available via the fiber connection. In other implementations, wireless station 120-B may bypass encapsulating the received data in an Ethernet MAC frame. In either case, wireless station 120-B may forward the data to wireless station 120-C. Wireless station 120-C receives the data packets, such as the Ethernet MAC frames, and forwards the data to wireless station 150. Similar to the discussion above, each of wireless stations 120-B and 120-C perform no QoS/priority mapping or slice mapping associated with the received and forwarded data.

Figure 4C:
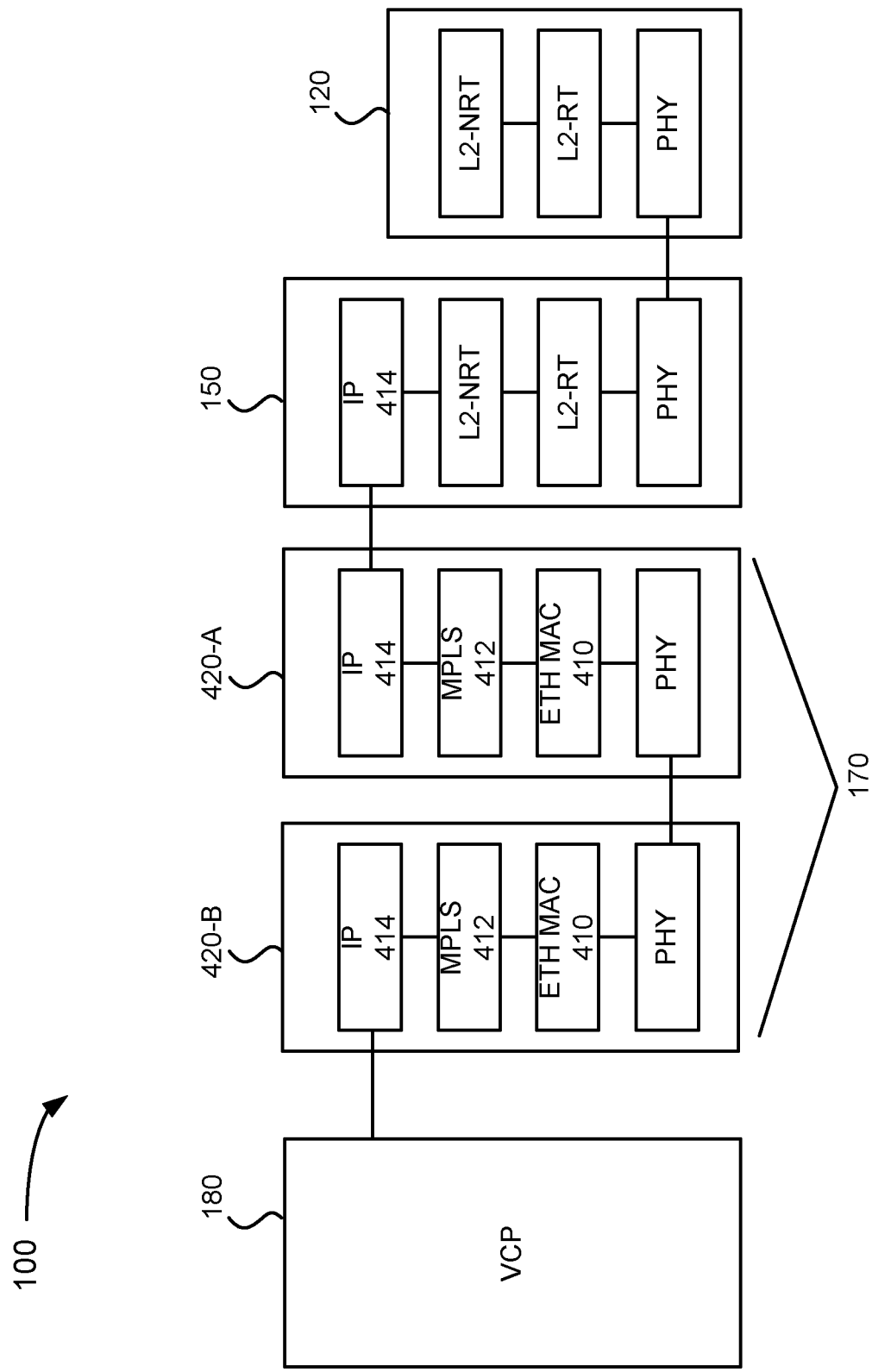

FIG. 4C illustrates a portion of environment 100 that includes backhaul network 170. For example, FIG. 4C illustrates wireless station 120, wireless stations 150, backhaul nodes 420-A and 420-B and VCP 180. Backhaul nodes 420-A and 420-B may be part of backhaul network 170. In an exemplary implementation, backhaul nodes 420-A and 420-B may be wired nodes configured to forward data via wired connections, such as via fiber optic cables. In this implementation, wireless station 120 forwards data to wireless station 150. Wireless station 150 may convert the wireless packets into wireline packets, including mapping the packets to Internet protocol (IP) packets, as indicated in IP block 414. Wireless station 150 may then forward IP packets to backhaul node 420-A. Backhaul node 420-A may implement multi-protocol label switching and Ethernet MAC frames to transport the packets to their intended destinations, as indicated by MPLS block 412 and Ethernet MAC block 410. Backhaul node 420-A may then forward the IP packets to backhaul node 420-B and on to their destinations. VCP 180 may control RAN slices in environment 100, such as control virtualized end-to-end slices that include the RAN and backhaul network 170. For example, VCP 180 may queue various packets, perform admission/ congestion control, etc.

Figure 4D:
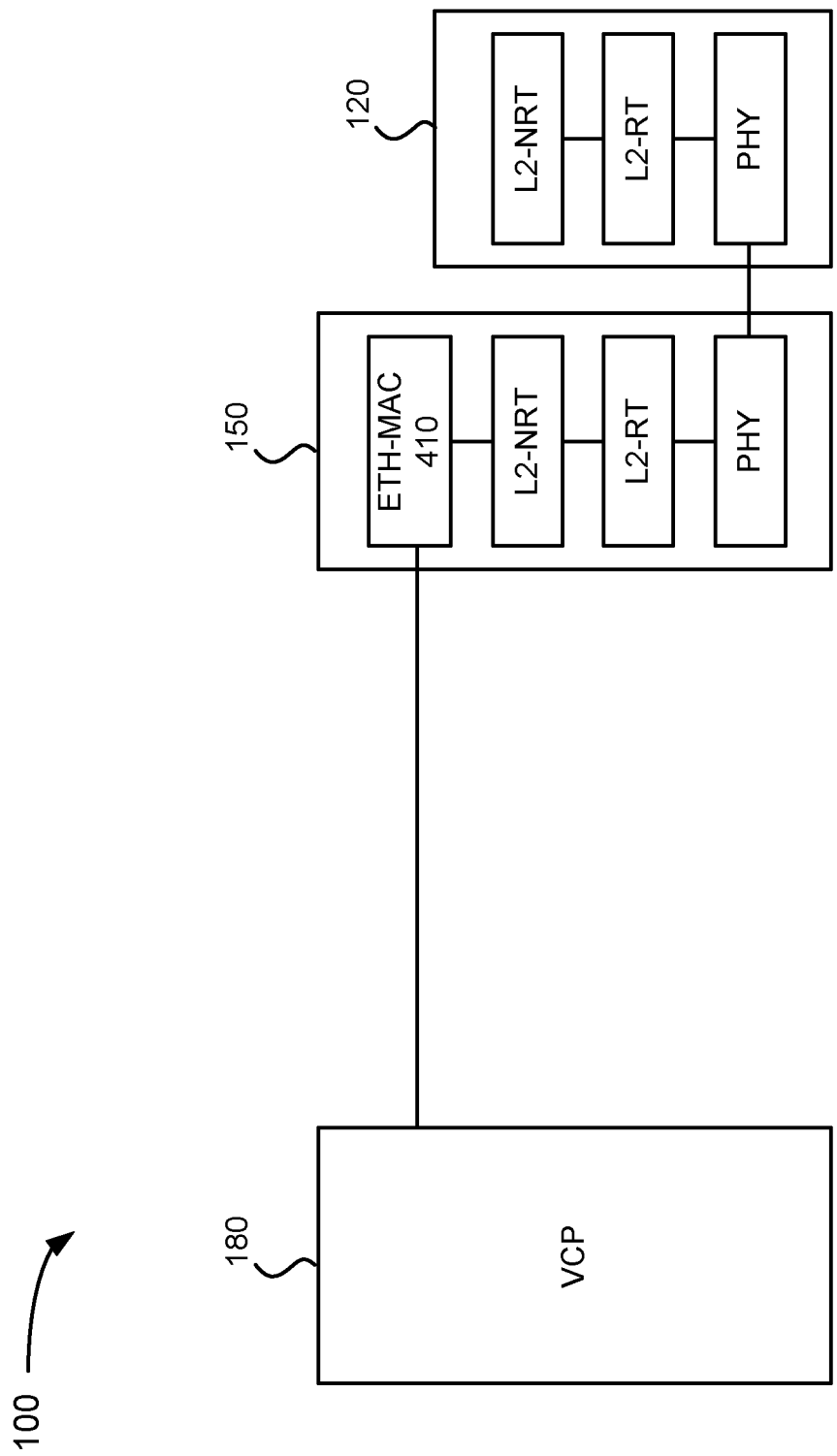

FIG. 4D illustrates another exemplary portion of environment 100 that includes wireless station 120, wireless station 150 and VCP 180. In this implementation, wireless station 150 encapsulates layer 1 and layer 2 data from wireless station 120 in an Ethernet MAC frame, as illustrated by block 410 in FIG. 4D. The Ethernet MAC frames from wireless station 150 may then be forwarded over fiber backhaul network 170 via wired and/or wireless connections under the control of VCP 180.

Figure 5B:
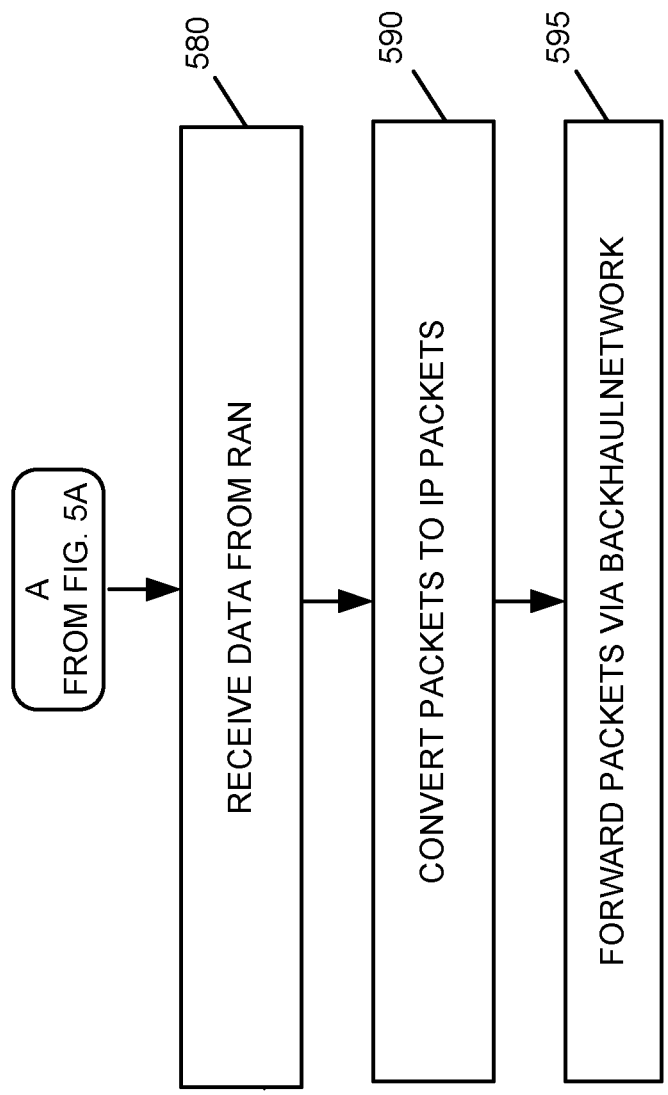

FIGS. 5A and 5B are flow diagrams illustrating forwarding packets to backhaul network 170 in environment 100 in accordance with an exemplary implementation. Processing may begin with UEs 110 transmitting data to wireless stations 120 via the RAN associated with environment 100 (block 510). For example, assume that UE 110-1 transmits data to wireless station 120-1 using a wireless channel associated with a 5G NR RAT. UEs 110-2 and 110-3 may similarly transmit data to wireless station 120-1 using a wireless channel associated with a 5G NR RAT. In an exemplary implementation, UEs 110 may be assigned a network slice, such as an end-to-end network slice through the RAN and backhaul network 170. A network slice may correspond to a logical network capable of being implemented or run on a shared physical network infrastructure, which may include one or more virtual network functions (VNFs) that provide the networking capabilities available to the users of the network slice. Within the network slice, a UE 110 may have one or multiple QoS flows. For example, in a 5G network, data sent from UEs 110 may include 5G QoS identifiers (5QIs). Each 5QI value may define or correlate to various 5G QoS characteristics, such as a default priority level, a packet error rate, a packet delay budget, etc., as well as correlate to a guaranteed bit rate (GBR), non-GBR, etc. Wireless station 120-1 receives the data from UEs 110-1, 110-2 and 110-3, which may include different 5QI values. Wireless station 120-1 aggregates or bundles the data from UEs 110-1, 110-2 and 120-3 and forwards the data to a next hop wireless station (e.g., wireless station 120-2 in environment 100) (block 520). For example, aggregation logic 320 may aggregate or combine the data received from UEs 110-1, 120-2 and 120-3 and forwarding logic 330 may forward the aggregated data without mapping the QoS/ priority information (e.g., the 5QI values) included in the received data.

Wireless station 120-1 receives the aggregated data and identifies a next hop toward backhaul network 170. In some instances, wireless station 120-1 may have a line of sight to a next hop wireless station, while in other instances wireless station 120-1 may not have a line of sight to a next hop wireless station 120, but may have a wired connection, such as a fiber optic connection, to a next hop wireless station 120. For example, in environment 100, wireless station 120-1 may have a wired connection 130 to wireless station 120-2. In either case, wireless station 120-1 determines if a wireless connection or a fiber connection exists to a next hop wireless station 120 (block 530).

If wireless station 120-1 determines that a wired connection exists to wireless station 120-2, wireless station 120-1 may encapsulate the data packets in an Ethernet MAC frame for forwarding to wireless station 120-2 (block 540). For example, forwarding logic 330 may generate an Ethernet MAC frame and encapsulate the received data in the Ethernet MAC frame, in a manner similar to that discussed above with respect to FIG. 4B. Forwarding logic 330 may then forward the Ethernet MAC frames to wireless station 120-2 (block 540). In this case, since the data is being transmitted via a fiber optic connection, any delay associated with encapsulating the data in a higher layer frame, such as an Ethernet MAC frame, is minimal and will not add any significant amount to latency associated with the network slice.

If wireless station 120-1 determines that a wired connection does not exist, but a wireless connection exists, wireless station 120-1 may wirelessly transmit the aggregated data to the next hop wireless station, such as wireless station 120-2 (block 550). In this scenario, aggregation logic 320 may bundle the data for transmission over a wireless channel without performing any mapping of the QoS/priority information included in the received data. In addition, if a wireless connection is available, wireless station 120-1 may not encapsulate the data into an Ethernet MAC frame.

In some implementations, both a wired and wireless connection may exist to the next hop wireless station. In such situations, the wired connection to the next hop wireless station (e.g., wireless station 120-2) may be used to transmit the data and the wireless connection may be used as a backup in case of a problem with the wired connection, or vice versa.

In each case, wireless station 120-2 receives the forwarded data (block 560). Wireless station 120-2 also receives data from UEs 110 that are serviced by wireless station 120-2 (block 560). For example, referring to FIG. 1, UEs 110-4 and 110-5 may be located within wireless range/line of sight of wireless station 120-2. In this case, wireless station 120-2 acts as the local wireless station for UEs 110-4 and 110-5 and provides a connection point for UEs 110. Wireless station 120-2 aggregates the data from the local UEs 110 with the data forwarded by wireless station 120-1 (block 570). Wireless station 120-2 may then forward the data to wireless station 150 (block 570). As discussed above, data received from UEs 110 via the RAN are forwarded to wireless station 150 (e.g., a donor gNB) without wireless station 120-2 performing any QoS/priority mapping or conversion of data packets into, for example, IP packets.

Wireless station 150 receives the forwarded data packets (FIG. 5B, block 580). Wireless station 150 may then convert the packets to IP packets for transmission over backhaul network 170 (block 590). For example, as discussed above with respect to FIG. 4C, wireless station 150 may convert the packets into higher level data packets, such as IP packets for transmission over backhaul network 170. Elements in backhaul network 170 may then forward the packets to their destinations (block 595). For example, VCP 180 may control the forwarding of data packets in backhaul network 170. In this manner, data transmitted over a number of hops in a RAN may be forwarded in a hop-by-hop manner without converting packets into IP packets and without converting QoS priority information, such as 5QI values.

Implementations described herein provide for forwarding packets in a RAN while maintaining the packets in their original format. This allows the wireless stations to efficiently forward data, ensures data integrity and retention of information and also allows the RAN to maintain slice priorities within the network. Further, maintaining the packets in their original format increases the speed associated with forwarding data packets and reduces latency. Further, by not converting packets into high level data packets, such as IP packets at each wireless station, troubleshooting of problems at the wireless stations is simplified.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to transmitting data via both wireless and wired (e.g., fiber) connections. In other implementations, wireless stations 120 included in the RAN may all communicate with each other wirelessly. In still other implementations, wireless stations 120 included in the RAN may all communicate with each other and wireless station 150 via wired connections. Further, as the introduction of fiber in an area increases, wireless stations 120 that communicate with other wireless stations 120 via wireless connections may switch to using the wired/fiber connections to communicate with other wireless stations 120 and/or be replaced by wireless stations 120 that communicate with other wireless stations 120 and/or wireless station 150 via wired/fiber connections. That is, the architecture of environment 100 is flexible and allows wireless stations 120 that communicate via wired or wireless connections to be used interchangeably.

In addition, environment 100 in FIG. 1 shows only two wireless stations 120 in each path to wireless station 150. However, in other implementations, additional wireless stations 120, such as five or more wireless stations 120 (e.g., eight, nine, etc.), may be included in a path to wireless station 150.

Further, while series of acts have been described with respect to FIGS. 5A and 5B, the order of the acts may be different in other implementations. Moreover, non-dependent acts may be implemented in parallel.

To the extent the aforementioned embodiments collect, store or employ personal information of individuals, it should be understood that such information shall be collected, stored and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving, at a first wireless station in a radio access network (RAN), first data wirelessly transmitted from a first plurality of user equipment (UE) devices, wherein the first data includes quality of service (QoS) information with different quality of service identifiers (QCIs);
   aggregating, by the first wireless station, the first data wirelessly transmitted from the first plurality of UE devices;
   forwarding, by the first wireless station, the first data from the first plurality of UE devices to a second wireless station in the RAN without mapping or modifying any of the QCIs;
   receiving, by the second wireless station, the first data;
   receiving, by the second wireless station, second data wirelessly transmitted from a second plurality of UE devices, wherein the second data includes QoS information; and
   forwarding, by the second wireless station, the first data and the second data to a third wireless station in the RAN, wherein the second wireless station does not map the QoS information included in the first data and the second data, and wherein third wireless station is configured to forward the first and second data via a backhaul network,
   wherein the first wireless station is coupled to the second wireless station via a wired connection, the method further comprising:
   encapsulating, by the first wireless station, the first data in an Ethernet packet; and
   forwarding the Ethernet packet to the second wireless station via the wired connection.

2. The method of claim 1, wherein the first and second wireless stations are configured to communicate in accordance with a Fifth Generation (5G) radio access technology type or protocol and the QoS information comprises 5G QoS identifiers.

3. The method of claim 1, wherein the forwarding of the first and second data to the third wireless station comprises forwarding the first and second data via a network slice.

4. The method of claim 1, wherein the first, second and third wireless stations each comprise a next generation node B (gNB), the method further comprising: forwarding, by the third gNB, the first and second data to the backhaul network via a wired connection.

5. The method of claim 1, wherein the first and second wireless stations each comprise wireless stations in the RAN configured to service UE devices within a wireless range of the respective first and second wireless stations.

6. The method of claim 1, further comprising:
   forwarding, by the first wireless station, the first data to at least one additional wireless station located on a path between the first wireless station and the second wireless station; and forwarding, by the at least one additional wireless station, the first data to the second wireless station.

7. The method of claim 1, wherein the first wireless station is configured to: determine whether a fiber connection or wireless connection exists to the second wireless station, wherein the fiber connection corresponds to the wired connection.

8. The method of claim 7, wherein the first wireless station is further configured to: transmit the first data via the fiber connection in response to determining that the fiber connection exists.

9. The method of claim 7, wherein the first wireless station is configured to: transmit the first data via the wireless connection, in response to determining that the wireless connection exists and in response to determining that the fiber connection is experiencing a problem.

10. A system, comprising: a plurality of wireless stations in a radio access network (RAN), wherein the plurality of wireless stations includes at least a first wireless station and a second wireless station, wherein the first wireless station is configured to: receive first data wirelessly transmitted from a first plurality of user equipment (UE) devices, wherein the first data includes quality of service (QoS) information with different quality of service identifiers (QCIs),
   aggregate the received first data, and
   forward the first data from the first plurality of UE devices to the second wireless station without mapping or modifying any of the QCIs, and
   wherein the second wireless station is configured to:
   receive the first data,
   receive second data wirelessly transmitted from a second plurality of UE devices, wherein the second data includes QoS information, and
   forward the first data and the second data to a third wireless station in the RAN, wherein the second wireless station does not map the QoS information included in the first data and the second data, and wherein the third wireless station is configured to forward the first and second data via a backhaul network,
   wherein the first wireless station is coupled to the second wireless station via a wired connection, and the first wireless station is further configured to:
   encapsulate the first data in an Ethernet packet, and
   forward the Ethernet packet to the second wireless station via the wired connection.

11. The system of claim 10, wherein the first and second wireless stations are configured to communicate in accordance with a Fifth Generation (5G) radio access technology type or protocol and the QoS information comprises 5G QoS identifiers.

12. The system of claim 10, further comprising: the third wireless station, wherein the third wireless station comprises a next generation node B (gNB), wherein the gNB is configured to forward the first and second data to the backhaul network via a wired connection.

13. The system of claim 10, further comprising: at least one additional wireless station located on a path between the first wireless station and the second wireless station, wherein the at least one additional wireless station is configured to: forward the first data to the second wireless station.

14. The system of claim 10, wherein the first wireless station is further configured to: determine whether a fiber connection or wireless connection exists to the second wireless station, wherein the fiber connection corresponds to the wired connection, and transmit the first data via the fiber connection in response to determining that the fiber connection exists.

15. The system of claim 14, wherein the first wireless station is configured to: transmit the first data via the wireless connection, in response to determining that the wireless connection exists and in response to determining that the fiber connection is experiencing a problem.

16. A device, comprising:
a memory configured to store instructions; and
at least one processor configured to execute the instructions stored in the memory to:
receive first data wirelessly transmitted from a first plurality of user equipment (UE) devices, wherein the first data includes quality of service (QoS) information with different Fifth Generation quality of service (QoS) identifiers (5QIs),
aggregate the first data wirelessly transmitted from the first plurality of UE devices,
receive second data transmitted from a second device in a radio access network (RAN) that includes the device, wherein the second data includes data transmitted from a second plurality of UE devices and includes 5QIs, wherein the second device does not map or modify the 5QIs in the second data,
encapsulate the first and second data in Ethernet packets, and
forward the Ethernet packets to a third device in the RAN via a wired connection, wherein when forwarding the Ethernet packets, the at least one processor does not map or modify the 5QIs included with the first data and the second data, and wherein the third device is configured to forward the first data and the second data via a backhaul network.

17. The device of claim 16, wherein the instructions further cause the at least one processor to:
determine whether a fiber connection or wireless connection exists to the third device, wherein the fiber connection corresponds to the wired connection, and
transmit the first data via the fiber connection in response to determining that the fiber connection exists.

18. The device of claim 16, wherein forwarding the Ethernet packets, the at least one processor is configured to forward the Ethernet packets via a network slice.

19. The method of claim 1, wherein forwarding the Ethernet packets comprises:
forwarding the Ethernet packets via a network slice.

20. The device of claim 16, wherein when forwarding the Ethernet packets, the at least one processor is configured to forward the Ethernet packets via a network slice.

* * * * *